United States Patent
Alahyari et al.

(10) Patent No.: US 12,237,727 B2
(45) Date of Patent: Feb. 25, 2025

(54) INDIRECT ROTOR COOLING OF ELECTRIC MACHINE

(71) Applicant: RTX Corporation, Farmington, CT (US)

(72) Inventors: Abbas A. Alahyari, Glastonbury, CT (US); Parag M. Kshirsagar, South Windsor, CT (US); Beata I. Wawrzyniak, South Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 220 days.

(21) Appl. No.: 17/871,286

(22) Filed: Jul. 22, 2022

(65) Prior Publication Data
US 2024/0030766 A1   Jan. 25, 2024

(51) Int. Cl.
*H02K 1/32* (2006.01)
*H02K 9/197* (2006.01)
*H02K 9/22* (2006.01)

(52) U.S. Cl.
CPC .............. *H02K 1/32* (2013.01); *H02K 9/197* (2013.01); *H02K 9/225* (2021.01); *H02K 2201/03* (2013.01)

(58) Field of Classification Search
CPC .......... H02K 1/32; H02K 9/225; H02K 9/197
See application file for complete search history.

(56) References Cited

U.S. PATENT DOCUMENTS

| | | | | |
|---|---|---|---|---|
| 5,744,880 A * | 4/1998 | Kudoh | ...................... | H02K 5/20 310/58 |
| 6,489,701 B1 * | 12/2002 | Gamble | ................... | H02K 3/24 310/55 |
| 7,566,999 B2 * | 7/2009 | Neal | ....................... | H02K 9/225 310/43 |
| 7,683,509 B2 * | 3/2010 | Neal | ........................ | H01F 27/10 310/58 |
| 11,025,115 B2 | 6/2021 | Larson et al. | | |
| 2024/0030766 A1 * | 1/2024 | Alahyari | ................ | H02K 9/197 |

FOREIGN PATENT DOCUMENTS

| | | |
|---|---|---|
| DE | 102016222850 A1 | 5/2018 |
| EP | 3627674 A1 | 3/2020 |
| JP | 2006136071 A | 5/2006 |
| JP | 20165305 A | 1/2016 |
| JP | 20165309 A | 1/2016 |
| JP | 6148206 B2 | 6/2017 |
| JP | 6148208 B2 | 6/2017 |
| WO | WO-2018091578 A1 * | 5/2018 ............... H02K 5/18 |

OTHER PUBLICATIONS

European Search Report for European Application No. 23174620.7; dated Dec. 6, 2023; 11 pages.

* cited by examiner

*Primary Examiner* — Robert W Horn
(74) *Attorney, Agent, or Firm* — CANTOR COLBURN LLP

(57) ABSTRACT

An electric machine includes a rotor located at and rotatable about a central axis and a stator positioned proximate to the rotor and defining a radial machine gap between the rotor and the stator. A cold plate is positioned proximate to the rotor. The cold plate is rotationally stationary relative to the central axis and is spaced apart from the rotor to define a cold plate gap between the cold plate and the rotor. The cold plate includes one or more coolant pathways therein such that thermal energy from the rotor is transferred to a flow of coolant circulated through the one or more coolant pathways.

18 Claims, 4 Drawing Sheets

INDIRECT ROTOR COOLING OF ELECTRIC MACHINE

STATEMENT OF FEDERAL SUPPORT

This invention was made with Government support under Government Contract No. DE-AR0001404 awarded by the United States Department of Energy. The Government has certain rights in the invention.

BACKGROUND

Exemplary embodiments of the present disclosure pertain to the art of electric machines, such as motors or drives.

High-power-density aviation-class electric motor and drives require advanced cooling technologies. One of the key challenges in cooling of rotors in these machines is the transfer of cooling fluid from a stationary frame to the rotating component and the need for a rotating seal between the frame and the rotor. This is particularly a concern if the coolant is a fuel or otherwise flammable.

This concern is particularly relevant to superconducting motors where the rotor windings generate a small heat loss and need to be cooled in order to maintain superconductivity. Further, this is particularly relevant when hydrogen fuel (either in liquid form or evaporating) is used directly as the cryo-coolant and leakage of hydrogen can have catastrophic consequences.

BRIEF DESCRIPTION

In one embodiment, an electric machine includes a rotor located at and rotatable about a central axis and a stator positioned proximate to the rotor and defining a radial machine gap between the rotor and the stator. A cold plate is positioned proximate to the rotor. The cold plate is rotationally stationary relative to the central axis and is spaced apart from the rotor to define a cold plate gap between the cold plate and the rotor. The cold plate includes one or more coolant pathways therein such that thermal energy from the rotor is transferred to a flow of coolant circulated through the one or more coolant pathways.

Additionally or alternatively, in this or other embodiments the cold plate gap is one or more of an axial gap or a radial gap.

Additionally or alternatively, in this or other embodiments the cold plate gap is one millimeter or less.

Additionally or alternatively, in this or other embodiments one or more conductive pathways are formed in the rotor.

Additionally or alternatively, in this or other embodiments the one or more conductive pathways includes one or more heat pipes or closed-loop pathways.

Additionally or alternatively, in this or other embodiments a volume of low pressure inert gas is located in the radial machine gap and the cold plate gap.

Additionally or alternatively, in this or other embodiments the flow of coolant is one or more of Helium or Hydrogen.

Additionally or alternatively, in this or other embodiments the cold plate gap is controlled hydrodynamically.

In another embodiment, an electric machine system includes an engine utilizing a flow of fuel and an electric machine. The electric machine includes a rotor located at and rotatable about a central axis, and a stator positioned proximate to the rotor and defining a radial machine gap between the rotor and the stator. A cold plate is positioned proximate to the rotor. The cold plate is rotationally stationary relative to the central axis and is spaced apart from the rotor to define a cold plate gap between the cold plate and the rotor. The cold plate includes one or more coolant pathways therein. The flow of fuel is utilized as a thermal energy transfer medium to cool the rotor.

Additionally or alternatively, in this or other embodiments the flow of fuel is circulated through the one or more coolant pathways therein such that thermal energy from the rotor is transferred to the flow of fuel.

Additionally or alternatively, in this or other embodiments an intermediate heat exchanger is configured such that the flow of fuel is directed through the intermediate heat exchanger to exchange thermal energy with a flow of coolant circulated through the one or more coolant pathways.

Additionally or alternatively, in this or other embodiments the cold plate gap is one or more of an axial gap or a radial gap.

Additionally or alternatively, in this or other embodiments the cold plate gap is one millimeter or less.

Additionally or alternatively, in this or other embodiments one or more conductive pathways formed in the rotor.

Additionally or alternatively, in this or other embodiments the one or more conductive pathways includes one or more heat pipes or closed-loop pathways.

Additionally or alternatively, in this or other embodiments a volume of low pressure inert gas is disposed in the radial machine gap and the cold plate gap.

Additionally or alternatively, in this or other embodiments a flow of coolant through the one or more coolant pathways is one or more of Helium or Hydrogen.

In yet another embodiment, a method of cooling a rotor of an electric machine includes positioning a cold plate proximate to a rotor, the cold plate spaced apart from the rotor defining a cold plate gap between the cold plate and the rotor, the cold plate rotationally stationary relative to a central axis of the rotor. A flow of coolant is circulated through one or more coolant pathways in the cold plate, and thermal energy is transferred from the rotor to the flow of coolant this cooling the rotor.

Additionally or alternatively, in this or other embodiments a flow of fuel is directed through an intermediate heat exchanger, and the flow of coolant is urged through the intermediate heat exchanger. The flow of coolant is cooled via thermal energy exchange with the flow of fuel.

Additionally or alternatively, in this or other embodiments thermal energy of the rotor is conducted toward the cold plate via on or more conductive pathways formed in the rotor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
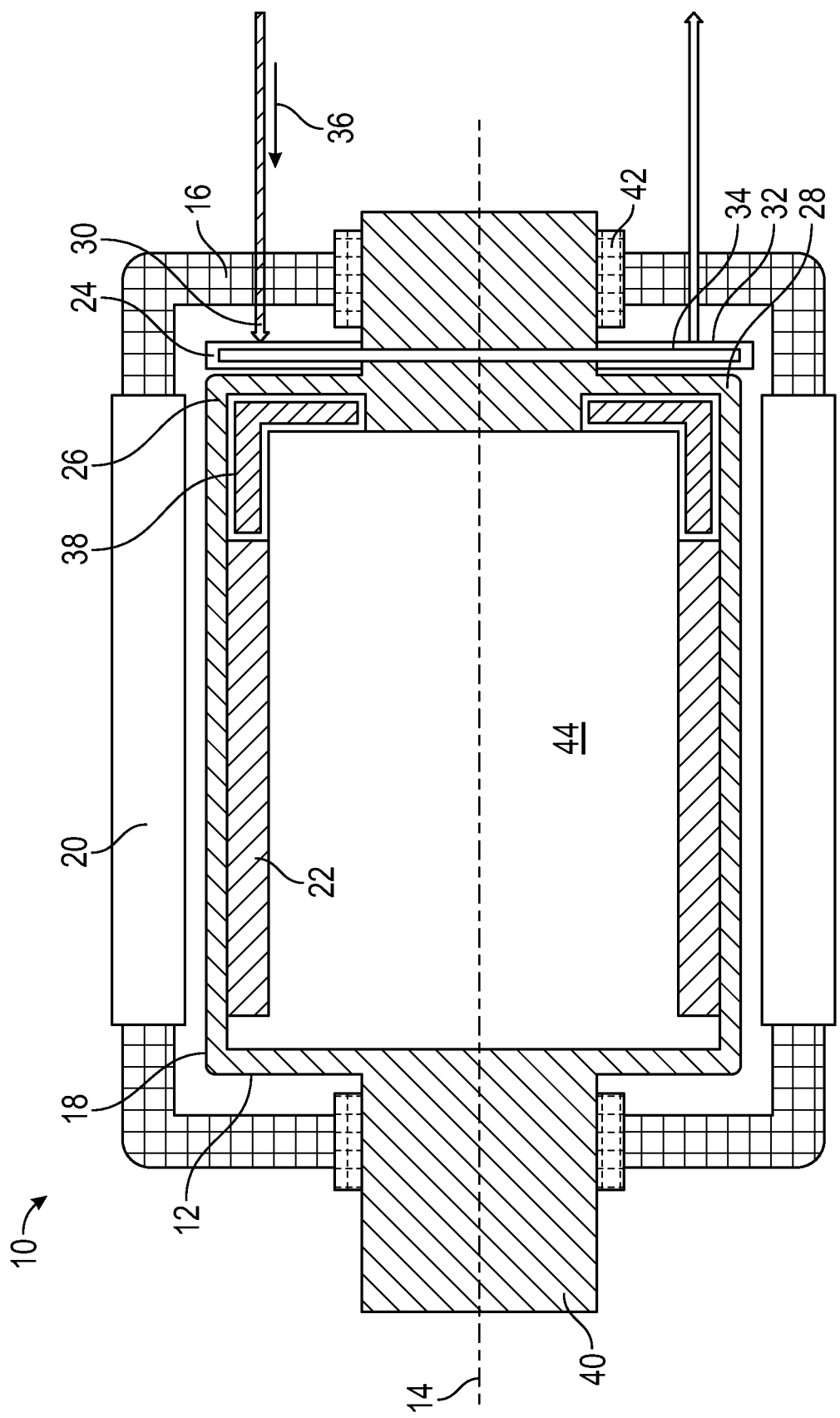
FIG. 1 is a perspective view of an embodiment of an electric machine.

FIG. 1 schematically illustrates an embodiment of an electric machine 10. The electric machine 10 is, for example, a motor or a drive, and includes a rotor 12 configured to rotate about a central axis 14. A stator 16 is located radially outboard of the rotor 12 and defines a radial gap 18 (e.g., radial machine gap) between the rotor 12 and the stator 16. The stator 16 includes stator windings 20 and similarly the rotor 12 includes field windings 22 such that electromagnetic interaction between the stator windings 20 and the field windings 22 across the radial gap 18 urges rotation of the rotor 12 about the central axis 14. While shown and described in FIG. 1 is an electric machine 10 having the rotor 12 located radially inboard of the stator 16, one skilled in the art will readily appreciate that the present disclosure may be readily applied to embodiments where the rotor 12 is, for example, located radially outboard of the stator 16 or wrapped around the stator 16 in a U-shaped configuration.

A rotationally stationary cold plate 24 is operably connected to the rotor 12. The cold plate 24 is located at the central axis 14 at an axial end 26 of the rotor 12. The cold plate 24 is positioned to define a cold plate gap 28 between the cold plate 24 and the rotor 12. In some embodiments, the cold plate gap 28 is 1 millimeter or less. In other embodiments, the cold plate gap 28 may include a distance greater than 1 millimeter (e.g., 1.2 millimeters, 1.5 millimeters, 2 millimeters, etc.). While in the illustrated embodiment the cold plate 24 is located at the axial end 26 of the rotor 12, one skilled in the art will readily appreciate that the cold plate 24 may be positioned at other locations, such as radially inside of the rotor 12, or radially outside of the rotor 12 as long the cold plate 24 is position with the required cold plate gap 28 to facilitate thermal energy transfer between the rotor 12 and the cold plate 24. The cold plate 24 has a coolant inlet 30 and a coolant outlet 32, with one or more coolant pathways 34 in the cold plate 24 extending between the coolant inlet 30 and the coolant outlet 32. A flow of coolant 36 is circulated through one or more coolant pathways 34 and thermal energy is transferred from the rotor 12 to the flow of coolant 36 across the cold plate gap 28. To improve the transfer of thermal energy, the rotor 12 may include one or more conductive pathways 38, for example, heat pipes or closed-loop fluid pathways, embedded in the rotor 12. The conductive pathways 38 conduct thermal energy through the rotor 12 toward the cold plate 24. In some embodiments, the conductive pathways 38 may have axial components as well as radial, or circumferential components to distribute and transfer the thermal energy.

To further insulate the electric machine 10 and improve thermal energy transfer, the stator 16 encloses the rotor 12 and the cold plate 24. A rotor shaft 40 extends from the rotor 12 along the central axis 14, and a ferrofluid seal 42 is located between the rotor shaft 40 and the stator 16 to seal a gap between the rotor shaft 40 and the stator 16. This enclosed volume 44 may be filled with a suitable fluid, such as an inert low pressure gas, such as Helium.

Figure 2:
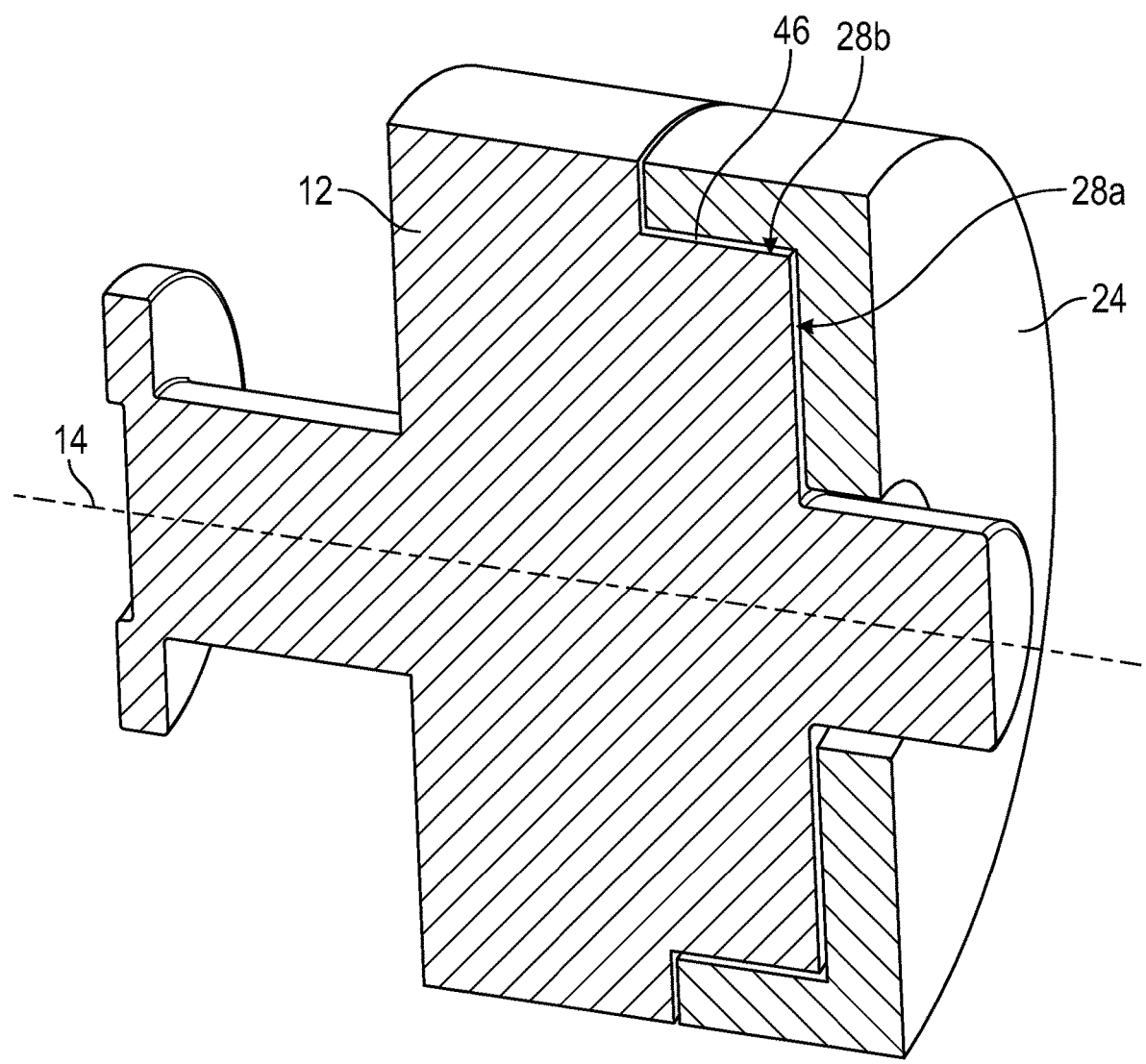
FIG. 2 is a cross-sectional view of an embodiment of a rotor for an electric machine.

While in the embodiment illustrated in FIG. 1 the cold plate gap 28 is an axial gap, in other embodiments, such as the embodiment of FIG. 2, the cold plate gap 28 has an axial portion 28a and a radial portion 28b. This is defined by an overlap of the cold plate 24 to the rotor 12 at a radially outboard surface 46 of the rotor 12. In some embodiments, the cold plate gap 28 is fixed, while in other embodiments the cold plate gap 28 may vary during operation of the rotor 12. In some embodiments, the cold plate gap 28 may be controlled hydrodynamically. For example, the cold plate 24 may be lightly preloaded against the rotor 12, and as the rotor 12 begins to rotate about the central axis 14 a thin gas film will develop between the rotor 12 and the cold plate 24 to define the cold plate gap 28. One or more of the cold plate 24 or the rotor 12 surfaces defining the cold plate gap 28 may be augmented with grooves, ridges or textures or shapes to enhance thermal energy transfer across the cold plate gap 28.

Figure 3:
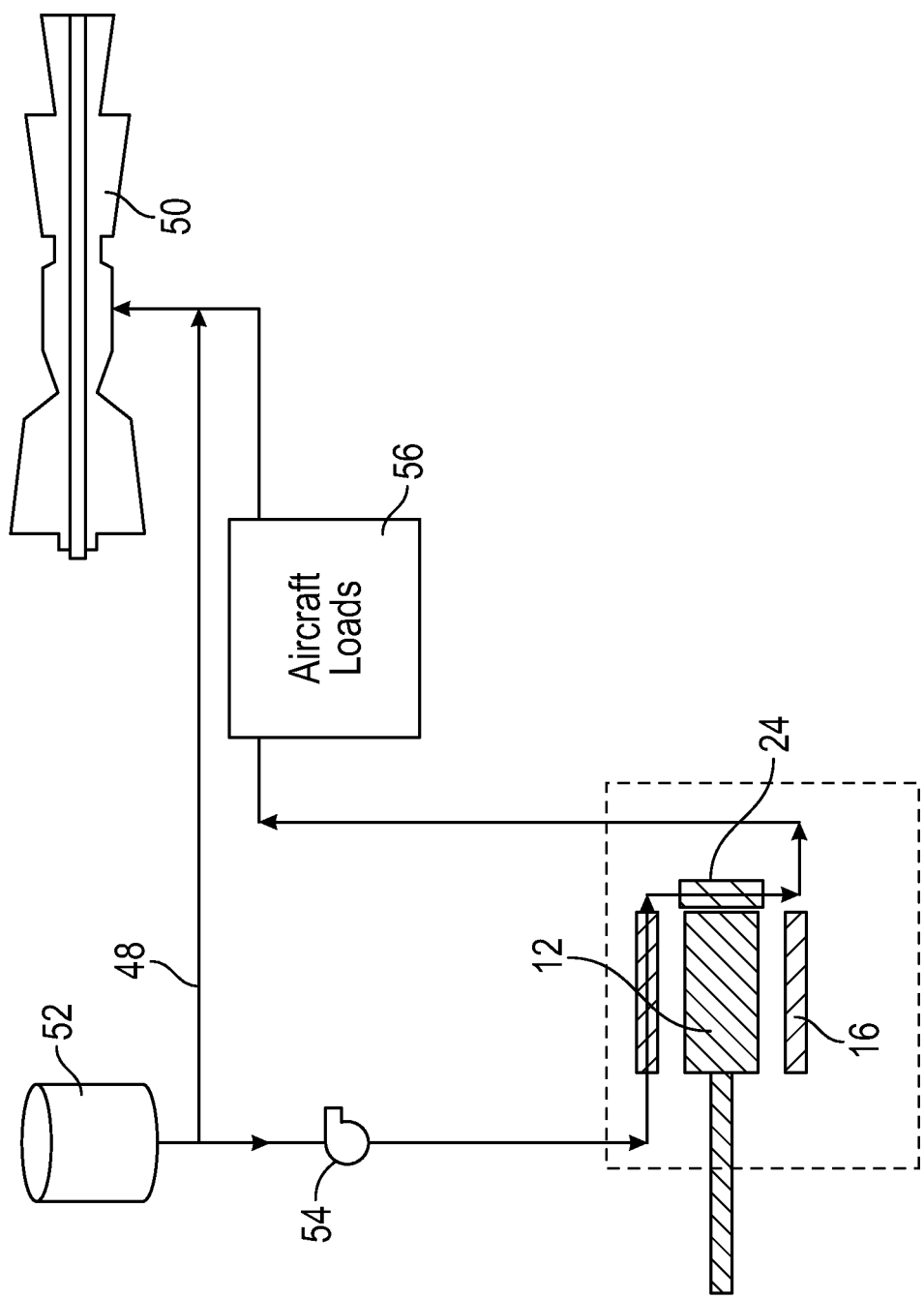
FIG. 3 is a schematic illustration of an embodiment of a cooling system for an electric machine.

Referring now to FIG. 3, a fuel flow 48 for a turbine engine 50 may be utilized in the cooling of the electric machine 10. For example, the fuel flow 48 is pumped from a fuel tank 52 by a fuel pump 54. The fuel flow 48 is utilized as the flow of coolant 36 directed through the cold plate 24. In some embodiments, the flow of coolant 26 further is directed through the stator 16 to cool the stator 16, and may also be utilized to cool other aircraft components or systems, schematically illustrated at 56. In some embodiments, the fuel flow 48 is liquid hydrogen at, for example, 20.3 degrees Kelvin and 1 bar pressure.

Figure 4:
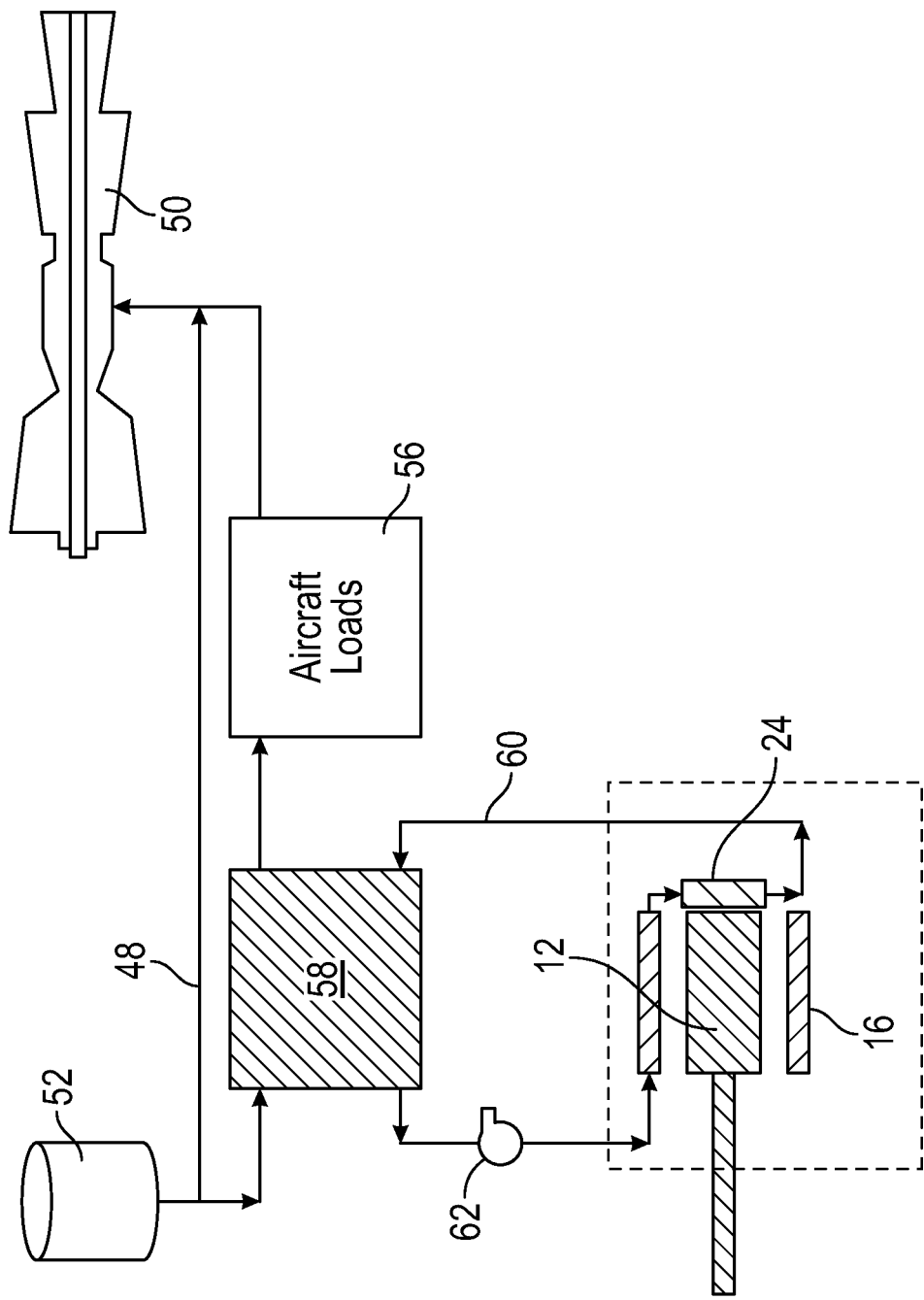
FIG. 4 is a schematic illustration of another embodiment of a cooling system for an electric machine.

In another embodiment, illustrated in FIG. 4, the fuel flow 48 is directed through an intermediate heat exchanger, such as a cryocooler 58. At the cryocooler 58, the fuel flow 48 exchanges thermal energy with the flow of coolant 36, which is circulated through a coolant loop 60 by a coolant pump 62. In some embodiments, such as the embodiment of FIG. 4, the fuel flow 48 is a liquid natural gas. The flow of coolant is, for example, one or more of Helium or Hydrogen. The flow of coolant 36 may be circulated through the stator 16 and the cold plate 24, while the fuel flow 48 is utilized to cool other aircraft components or systems 56, before proceeding to the turbine engine 50 for use by the turbine engine 50.

The use of the cold plate 24 to remove thermal energy from the rotor 12 avoids the issues associated with rotating seals or stationary-to-rotating couplings that are needed when flowing coolant into a rotor, while still effectively cooling the rotor 12. Such a configuration allows for compatibility with flammable fuels, such as liquid hydrogen, to be utilized as the flow of coolant 36.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An electric machine, comprising:
   a rotor disposed at and rotatable about a central axis;
   a stator disposed proximate to the rotor and defining a radial machine gap between the rotor and the stator; and
   a cold plate disposed proximate to the rotor, the cold plate rotationally stationary relative to the central axis and spaced apart from the rotor to define a cold plate gap between the cold plate and the rotor, the cold plate including one or more coolant pathways therein such that thermal energy from the rotor is transferred to a flow of coolant circulated through the one or more coolant pathways;
   wherein the cold plate gap is configured to vary during operation of the electric machine.

2. The electric machine of claim 1, wherein the cold plate gap is one or more of an axial gap or a radial gap.

3. The electric machine of claim 1, wherein the cold plate gap is one millimeter or less.

4. The electric machine of claim 1, further comprising one or more conductive pathways formed in the rotor.

5. The electric machine of claim 1, wherein the one or more conductive pathways includes one or more heat pipes or closed-loop pathways.

6. The electric machine of claim 1, wherein a volume of low pressure inert gas is disposed in the radial machine gap and the cold plate gap.

7. The electric machine of claim 1, wherein the flow of coolant is one or more of Helium or Hydrogen.

8. The electric machine of claim 1, wherein the cold plate gap is controlled hydrodynamically.

9. An electric machine system, comprising:
   an engine utilizing a flow of fuel;
   an electric machine including:
      a rotor disposed at and rotatable about a central axis;
      a stator disposed proximate to the rotor and defining a radial machine gap between the rotor and the stator; and
      a cold plate disposed proximate to the rotor, the cold plate rotationally stationary relative to the central axis and spaced apart from the rotor to define a cold plate gap between the cold plate and the rotor, the cold plate including one or more coolant pathways therein;
   wherein the flow of fuel is utilized as a thermal energy transfer medium to cool the rotor.

10. The electric machine system of claim 9, wherein the flow of fuel is circulated through the one or more coolant pathways therein such that thermal energy from the rotor is transferred to the flow of fuel.

11. The electric machine system of claim 9, further comprising an intermediate heat exchanger configured such that the flow of fuel is directed through the intermediate heat exchanger to exchange thermal energy with a flow of coolant circulated through the one or more coolant pathways.

12. The electric machine system of claim 9, wherein the cold plate gap is one or more of an axial gap or a radial gap.

13. The electric machine system of claim 9, wherein the cold plate gap is one millimeter or less.

14. The electric machine system of claim 9, further comprising one or more conductive pathways formed in the rotor.

15. The electric machine system of claim 9, wherein the one or more conductive pathways includes one or more heat pipes or closed-loop pathways.

16. A method of cooling a rotor of an electric machine, comprising:
   positioning a cold plate proximate to a rotor, the cold plate spaced apart from the rotor defining a cold plate gap between the cold plate and the rotor, the cold plate rotationally stationary relative to a central axis of the rotor;
   circulating a flow of coolant through one or more coolant pathways in the cold plate; and
   transferring thermal energy from the rotor to the flow of coolant this cooling the rotor;
   wherein the cold plate gap is configured to vary during operation of the electric machine.

17. The method of claim 16, further comprising:
   directing a flow of fuel through an intermediate heat exchanger;
   urging the flow of coolant through the intermediate heat exchanger; and
   cooling the flow of coolant via thermal energy exchange with the flow of fuel.

18. The method of claim 16, conducting thermal energy of the rotor toward the cold plate via on or more conductive pathways formed in the rotor.

* * * * *